United States Patent [19]
Fierkens

[11] Patent Number: 5,326,243
[45] Date of Patent: Jul. 5, 1994

[54] COMPRESSION-CAVITY MOLD FOR PLASTIC ENCAPSULATION OF THIN-PACKAGE INTEGRATED CIRCUIT DEVICE

[76] Inventor: Richard H. J. Fierkens, Keurbeck 15, 6914 Ae Herwen, Netherlands

[21] Appl. No.: 904,469

[22] Filed: Jun. 25, 1992

[51] Int. Cl.[5] ............... B29C 45/02; B29C 45/56
[52] U.S. Cl. .................. 425/116; 264/272.17; 425/128; 425/129.1; 425/217; 425/544; 425/DIG. 228
[58] Field of Search .............. 249/82; 264/272.17; 425/116, 117, 128, 129.1, 215, 217, 544, DIG. 228

[56] References Cited

U.S. PATENT DOCUMENTS

| | | | |
|---|---|---|---|
| 4,614,418 | 2/1987 | Meddles | 264/272.17 |
| 4,812,114 | 3/1989 | Kennon et al. | 425/116 |
| 4,900,501 | 2/1990 | Saeki et al. | 264/272.17 |

FOREIGN PATENT DOCUMENTS

| | | | |
|---|---|---|---|
| 60-97815 | 5/1985 | Japan | 264/272.17 |
| 3-232245 | 10/1991 | Japan | 264/272.17 |

*Primary Examiner*—James Mackey
*Attorney, Agent, or Firm*—Antonio R. Durando; Harry M. Weiss

[57] ABSTRACT

A molding apparatus having variable-volume cavities is provided. The apparatus consists of a lower and an upper mold defining a cavity for the lead frame, and having a conduit for forcing fluid plastic from a reservoir to the cavity for encapsulating an integrated circuit bonded to a lead frame. A pressure source is used to force the plastic from the reservoir through the conduit into both the upper and lower portions of the cavity surrounding the lead frame. The cavity of the mold is equipped with at least one piston-like insert slideably mounted in a bore hole in the surface of the cavity. The insert can be compressed or expanded to reduce or increase, respectively, the volume of the cavity. Thus, the final size of the cavity in the mold is determined by the position of the insert at the end of the encapsulation process. By allowing the expansion of the insert during a first phase of the molding operation, excess plastic is forced into the cavity. During a second phase, the volume of the cavity is reduced to its final size by the application of back pressure on the insert, causing the excess molten plastic to be forced out of the cavity together with residual air bubbles trapped in the plastic.

14 Claims, 2 Drawing Sheets

5,326,243

COMPRESSION-CAVITY MOLD FOR PLASTIC ENCAPSULATION OF THIN-PACKAGE INTEGRATED CIRCUIT DEVICE

RELATED APPLICATIONS

This application is related to U.S. application Ser. No. 07/814,505 filed on Dec. 30, 1991, by the same inventor, now U.S. Pat. No. 5,275,546.

BACKGROUND OF THE INVENTION

1. Field of the Invention

This invention pertains to the general field of packages and packaging methods for semiconductor devices; in particular, the invention relates to an improved plastic encapsulation apparatus and method for a very thin device having an integrated circuit bonded to a lead frame and packaged in molten plastic according to procedures commonly used in the industry.

2. Description of the Prior Art

In a typical prior art system for bonding and encapsulating integrated circuits, a plurality of such circuits is arranged in a work-piece that contains a series of identical lead frames etched or stamped on a strip of metallic substrate. A chip is bonded to each of these premanufactured lead frames and they are loaded into a bottom mold having a cavity and shallow impressions corresponding to each lead frame, the number of lead frames in a single batch being determined by the mold size and the capacity of the particular molding equipment used. A top mold having cavities aligned with the cavities in the bottom mold is moved into place on top of the bottom mold, so that the two molds together define a cavity corresponding to the intended volume of each integrated circuit package. Some means is provided within the molding equipment to heat the molds to the proper temperature for molding. The heated molds are clamped together and, when the temperature is right, usually at approximately 175° C., molding material, such as epoxy in pellet form, is placed in the mold set through bores formed in the top or bottom mold. Plungers are then inserted into the bores and a pressurizing force is exerted on the plungers. The combination of the plunger force and the temperature causes the epoxy pellets to liquify and flow into the cavities provided in the mold set, which determine the configuration and location of the molded plastic that encapsulates the integrated circuits.

Alternatively, in some equipment molten plastic is forced into the cavity defined by the top and bottom molds through a flow conduit connected either to the top or bottom mold. A pressure source forces the molten plastic from a retaining reservoir, where it is heated to flow conditions, through the conduit, into the top or bottom cavity, and around the integrated circuit and lead frame to form a package for the device. The plastic flows from one side of the lead frame to the other, filling the cavity and thereby encapsulating the integrated circuit and adjacent portions of the lead frame contained therewithin, as determined by the geometry of the cavity.

All apparatus and methods of the prior art only inject plastic into either the top or bottom cavity, depending on pressure to force the plastic to the other cavity, around the integrated circuit and lead frame. This approach can cause air pockets to be formed in the plastic material flowing under the lead frame. In addition, it requires high operating pressures to force the plastic to flow from one portion of the mold cavity through the lead frame sandwiched between the top and bottom molds. A special problem exists when dealing with very thin devices that require particularly thin plastic packages (in the order of one millimeter). In such cases the presence of air pockets in the plastic is even more critical to the life and performance of the device. Therefore, a special need exists to ensure that all air is removed during the molding process.

Accordingly, there exists a need to provide an improved plastic encapsulation apparatus which not only provides a more uniform flow of plastic around the lead frame, as achieved by the invention disclosed in my copending application referenced above, but that also forces trapped air to flow out of the molten plastic, thereby reducing the likelihood of air pockets and other imperfections remaining in the finished plastic package. This is the objective to which this application is directed.

BRIEF SUMMARY OF THE INVENTION

An objective of this invention to provide an improved plastic encapsulation apparatus and method for an integrated circuit lead frame yielding a more uniform flow of plastic around the lead frame, thereby reducing the likelihood of imperfections in the final plastic package.

Another objective of the invention is to provide a system of encapsulation that is particularly effective in eliminating imperfections in very thin packages.

Another goal of the invention is a system that facilitates the extraction of air bubbles trapped in the plastic package during the initial filling of the mold's cavity.

Still another goal of the invention is the ability to apply the same general concept in a variety of lead-frame and mold designs to fit the various packages and packaging methods currently known in the art.

A final objective of this invention is the realization of the above mentioned goals in an economical and commercially viable manner.

According to the present invention, a molding apparatus having variable-volume cavities is provided. The apparatus consists of a lower and an upper mold defining a cavity for the lead frame, and having a conduit for forcing fluid plastic from a reservoir to the cavity for encapsulating an integrated circuit bonded to a lead frame. A pressure source is used to force the plastic from the reservoir through the conduit into both the upper and lower portions of the cavity surrounding the lead frame. The cavity of the mold is equipped with at least one piston-like insert slideably mounted in a bore hole in the surface of the cavity. The insert can be compressed or expanded to reduce or increase, respectively, the volume of the cavity. Thus, the final size of the cavity in the mold is determined by the position of the insert at the end of the encapsulation process. By allowing the expansion of the insert during a first phase of the molding operation, excess plastic is forced into the cavity. During a second phase, the volume of the cavity is reduced to its final size by the application of back pressure on the insert, causing the excess molten plastic to be forced out of the cavity together with residual air bubbles trapped in the plastic.

Various other purposes and advantages of the invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

The main feature of the invention disclosed in this application concerns the utilization of piston inserts in the top or bottom mold, or both, to permit excess plastic to flow into the cavity of the mold during a first phase of the molding operation, which is carried out according to the teachings of the prior art, preferably including the teachings of my copending application referenced above. In a second phase of the molding operation, the piston inserts are compressed to reduce the cavity to the intended final size of the package, thus forcing all excess plastic out of the cavity. In the process, the back pressure exerted on the fluid plastic tends to squeeze out any air trapped within it during the first phase.

Figure 1:
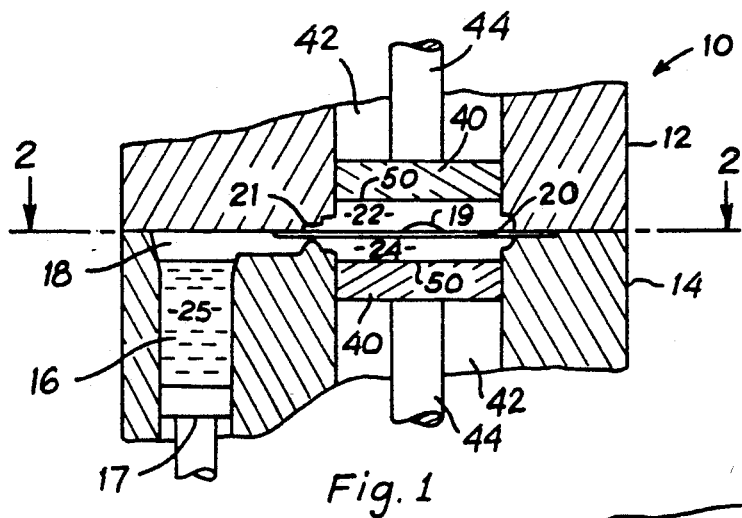
FIG. 1 is a cross-sectional view of the apparatus of the present invention showing an upper and a lower mold with a piston insert, a plastic reservoir, a conduit, and a lead frame to be packaged with plastic encapsulating material.

The method and apparatus of the present invention can be best understood by referring to the figures. Although the invention is suitable for application with any prior art molding apparatus, it will be described here for convenience with reference to a mold for a single-lead frame of the type disclosed in my copending application. FIG. 1 shows the apparatus 10 comprising an upper mold 12 with an upper package cavity 22, a lower mold 14 with a lower package cavity 24, a plastic reservoir 16 within the lower mold 14, a plastic injection pressure source 17, a flow conduit 18 within the lower mold 14, and a flow pocket 21 within the upper mold 12. A lead frame 20 with a semiconductor chip 19 bonded to its pad is shown sandwiched between the two molds for processing.

According to the invention, the apparatus 10 also comprises a piston insert 40 slideably mounted in a receiving bore hole 42 in one or both molds (shown in both upper and lower mold in the drawings). The bore hole 42 consists of an aperture, which is shown as cylindrical in the drawings but may have any cross-sectional shape, coaxial with the lead frame and extending outwardly from the mold's cavity. The piston insert 40 consists of a body having the same geometry of the bore hole 42 and having an inner surface 50 that matches the intended shape of the mold's cavity. The insert is slightly smaller than the bore hole, so that it can be inserted therethrough in slidable cooperation in the same manner that a piston is contained in a cylinder. Thus, the surface 50 of the insert 40 defines a variable boundary for the mold's cavity (both in the upper cavity 22 and the lower cavity 24), which may be enlarged by extracting the insert or reduced by compressing it. An insert pressure source 44 is provided to effect the compression of each insert 40.

Figure 2:
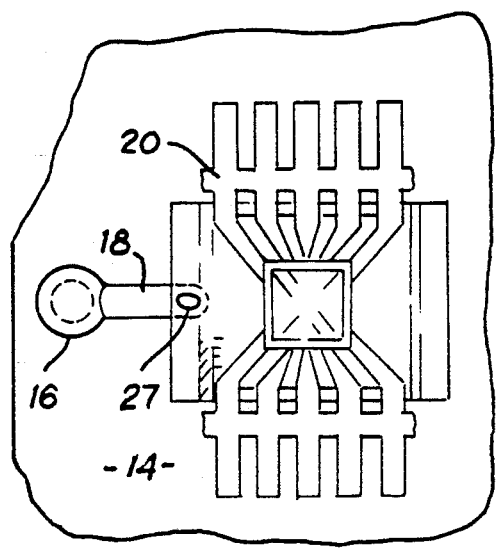
FIG. 2 is a top view of the apparatus shown in FIG. 1 taken along line 2—2 in FIG. 1, showing the lower mold, plastic reservoir, and lead frame to be packaged.

The lead frame 20 is placed as shown in FIG. 2 within impressions in the lower mold 14 (see also FIGS. 1 and 3) that correspond precisely to the shape of the lead frame 20 to be processed, such impressions being substantially the same depth as the thickness of the lead frame 20. The lead frame has a hole 27 that allows the molten plastic to flow from the conduit 18 to the flow pocket 21. Once the lead frame 20 is placed in the lower mold 14, the upper mold 12 is secured into the proper position on top of the lower mold 14, as shown in FIG. 1. The molten plastic 25 in the reservoir 16 is then pushed by the pressure source 17 (typically a piston-type plunger), through the conduit 18 and the flow pocket 21, into the lower package cavity 24 and the upper package cavity 22, as detailed in my copending application. The hole 27 in the lead frame 20 and the flow pocket 21 allow the plastic 25 to flow simultaneously to both the top and bottom sides of the lead frame. This more uniform flow requires less pressure to achieve encapsulation and also reduces the likelihood of air pockets and other defects that are often found in the final plastic package.

Figure 3:
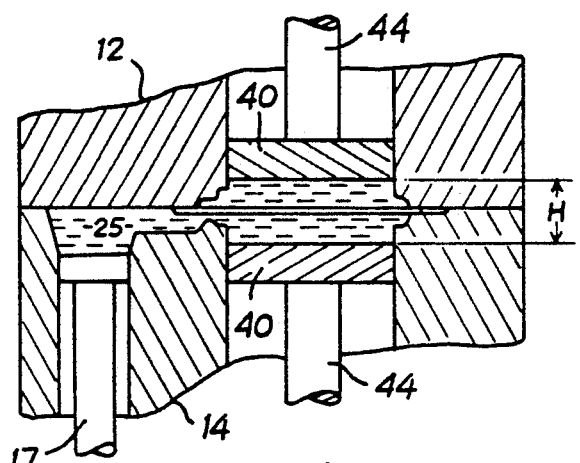
FIG. 3 is a cross-sectional view of the apparatus of FIG. 1 showing the upper and lower molds and their respective piston inserts after the plastic in the reservoir has been forced into the cavity around the lead frame while the pistons expand to allow excess plastic into the cavity.

According to this invention, during the first stage of the encapsulation process, the piston inserts 40 are allowed to expand under the pressure exerted by the flowing plastic, so that the mold's cavity is filled to an overall thickness H, in excess of the volume required to form the final semiconductor package, as shown in FIG. 3. This is achieved by applying less pressure on the pressure sources 44 than on the injection pressure source 17. The extent to which the inserts 40 are allowed to expand is arbitrary, but only an amount sufficient to ensure that the cavity contains enough plastic to form a completely air-free package is necessary. A volume about twice that required for the package is recommended. The flow of plastic continues until both the upper package cavity 22 and the lower package cavity 24, as defined by the position of the corresponding piston inserts 40, are completely full.

Figure 4:
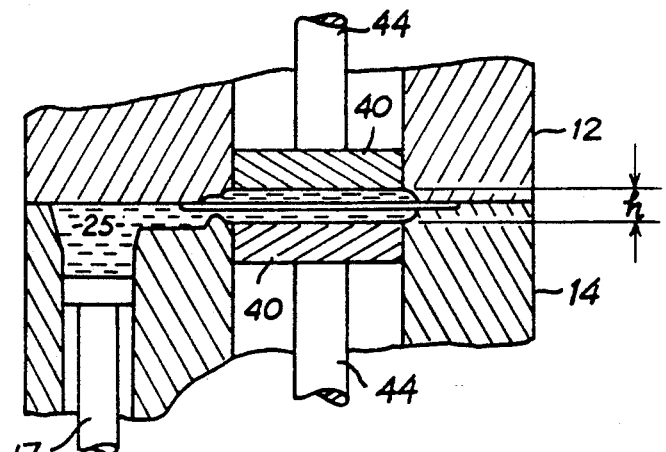
FIG. 4 is a cross-sectional view of the apparatus of FIG. 1 after the excess plastic in the cavity has been forced out through the conduit by the compression of the pistons in the top and bottom molds.

At this point, while the plastic in the mold's cavity is still hot and fluid, pressure is exerted on the insert pressure sources 44 to compress the plastic in the cavity against the back pressure of the pressure source 17. The plastic 25 in the cavity is thus compressed to the final size of the package by controlling the travel of the insert 40 to the position corresponding to the desired package thickness. By carefully controlling the back pressure exerted by the injection pressure source 17, against which the plastic overflow is pushed out of the cavity, the air trapped in the plastic is squeezed out of the cavity resulting in a uniformly dense package. This condition is illustrated in the cross-sectional view of FIG. 4, where the inserts 40 have been forced against the molten plastic in the cavities 22 and 24 of the mold to compress it to the final size h of the semiconductor package.

Figure 5:
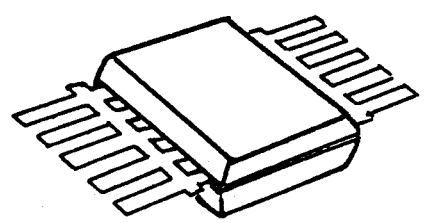
FIG. 5 is a perspective view of an integrated circuit lead frame with its plastic package after processing with the apparatus of the present invention.

This invention is particularly useful for thin packages, in the order of 0.8 to 1.4 millimeters, because of the greater relative impact of air bubbles in thin plastic layers. For illustrative purposes, an integrated circuit lead frame with leads on two sides of the package is shown in FIG. 5. Note that this specific example is for illustration only, and many different types of integrated circuit packages and configurations could be used in conjunction with the apparatus of the present invention. The upper and lower molds of the invention are preferably of metal construction, such as stainless steel, but may be made from other materials without departing from the scope of this invention.

Figure 6:
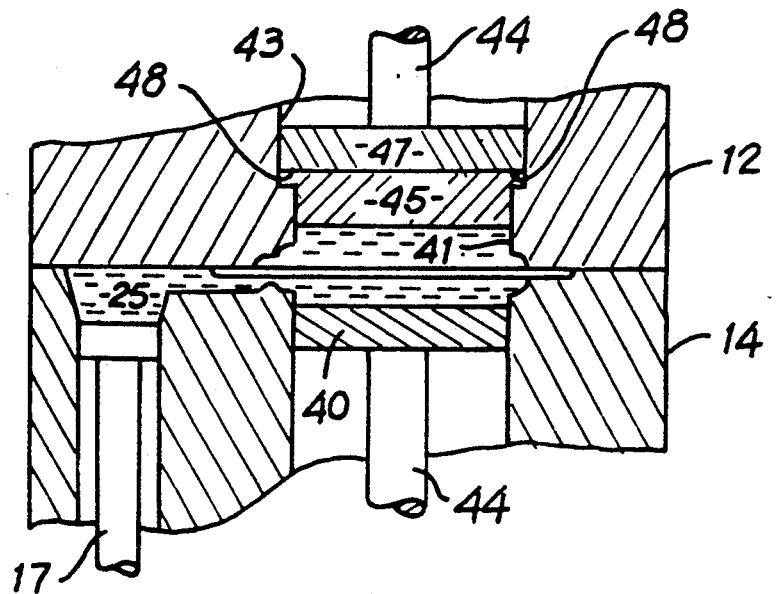
FIG. 6 is a cross-sectional view of the apparatus of FIG. 1 with a modified upper mold and piston insert, showing the upper and lower molds and their respective piston inserts after the plastic in the reservoir has been forced into the cavity around the lead frame while the pistons expand to allow excess plastic into the cavity.
Figure 7:
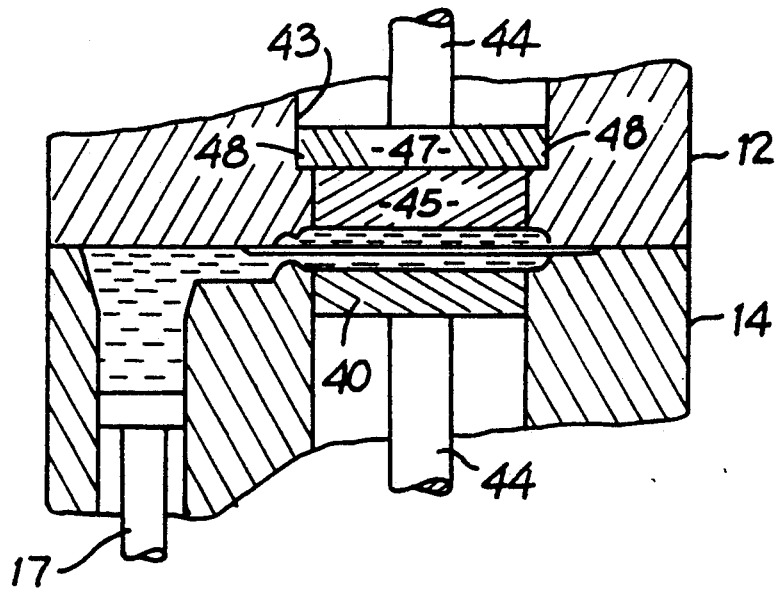
FIG. 7 is a cross-sectional view of the apparatus of FIG. 6 after the excess plastic in the cavity has been forced out through the conduit by the compression of the pistons in the top and bottom molds.

Note also that no particular method is described here to control the travel of the piston inserts 40 to ensure proper tolerances in the dimensions of the final package. This control feature could be implemented in a variety of ways that would be known to one skilled in the art as a matter of design choice. For example, each bore hole 42 could be designed as comprising two separate portions of different cross-sectional dimensions. Using the upper mold 12 in FIG. 1 for illustration, FIG. 6 shows an inner portion 41 of the bore hole that extends outwardly from the mold's cavity 22. The inner portion 41 is connected outwardly to an outer portion 43 having a larger cross-section, so that an annular recess surface 48 is defined in the lower part of the outer portion 43. The cross-sectional shape of either portion of the bore hole is not critical to the invention, so long as a recess surface results at their threshold. Conforming to the geometry of the bore hole, the piston insert is also designed as having two integral portions, a smaller inner portion 45 and a larger outer portion 47. Thus, the motion of the piston insert during compression is limited by the annular recess surface 48, which functions as a stopper and fixes the minimum size of the cavity during compression. This condition is illustrated in FIG. 7.

While the invention has been described in its preferred embodiment, it is to be understood that the words which have been used are words of description rather than limitation, and that changes may be made within the purview of the appended claims without departing from the true scope and spirit of the invention in its broader aspects. For example, the apparatus of the present invention could have the conduit 18 defined in the upper mold 12 and the flow pocket 21 defined by the lower mold 14 with equivalent function and results.

Therefore, various changes in the details, steps and materials that have been described may be made by those skilled in the art within the principles and scope of the invention herein illustrated and defined in the appended claims. It is recognized that departures can be made from the preferred embodiment within the scope of the invention, which is therefore not to be limited to the details disclosed herein, but is to be accorded the full scope of the claims, so as to embrace any and all equivalent apparatus and methods.

I claim:

1. A compression-cavity mold for encapsulating a thin-package integrated circuit lead frame in plastic, comprising:

a plastic-package mold assembly comprising an integral lower mold defining a lower cavity that includes shallow impressions wherein the integrated circuit lead frame is placed and comprising an integral upper mold defining an upper cavity, said upper mold being adapted for placement on said lower mold;

a reservoir for the plastic material used in the mold assembly;

a conduit in said mold assembly connecting said reservoir to said upper cavity and said lower cavity, so that plastic in said reservoir has a path of travel through said conduit and into both said upper and lower cavities;

first pressure means for forcing the plastic in said reservoir through said conduit and into said upper and lower cavities;

a bore hole in at least one of said integral upper and lower molds, said bore hole being coaxial with the lead frame and extending outwardly from the cavity associated with said at least one of said integral upper and lower molds;

an insert slideably mounted in said bore hole, said insert consisting of a body having the same cross-sectional shape as the cross-sectional shape of the bore hole and having an inner surface that matches the intended shape of the cavity associated with said at least one of said upper and lower molds, and said insert being adapted for inward movement with respect to said mold associated with said bore hole in response to a pressure exerted on the insert, so that the position of the insert in the bore hole defines the thickness of the plastic forced into the mold assembly by said first pressure means; and second pressure means applied directly to said insert for causing the insert to slide inwardly with respect to said mold associated with said bore hole, thereby forcing excess plastic in said upper and lower cavities to flow through said conduit back into said reservoir, so that the thickness of the plastic forced into the mold assembly by said first pressure means can be reduced to a predetermined final thickness desired for the package of the integrated circuit lead frame.

2. The apparatus of claim 1, wherein said first pressure means for forcing the plastic in said reservoir through said conduit and into said upper and lower cavities consists of a plunger.

3. The apparatus of claim 1, wherein said bore hole and said insert slideably mounted therein are cylindrical in shape.

4. The apparatus of claim 1, wherein said second pressure means applied to said insert for forcing excess plastic in said upper and lower cavities to flow through said conduit and into said reservoir consists of a plunger.

5. The apparatus of claim 3, wherein said second pressure means applied to said insert for forcing excess plastic in said upper and lower cavities to flow through said conduit and into said reservoir consists of a plunger.

6. The apparatus of claim 1, wherein the final thickness of the package of the integrated circuit lead frame, as defined by said bore hole and insert, is between 0.8 and 1.4 millimeters.

7. The apparatus of claim 5, wherein the final thickness of the package of the integrated circuit lead frame, as defined by said bore hole and insert, is between 0.8 and 1.4 millimeters.

8. A compression-cavity mold assembly for encapsulating a thin-package integrated circuit lead frame in plastic, comprising:

a lower mold defining a lower cavity formed within said lower mold and including shallow impressions wherein the integrated circuit lead frame is placed;

an upper mold defining an upper cavity formed within said upper mold, said upper mold being adapted for clamped placement over said lower mold to form an enclosed cavity around the integrated circuit lead frame;

a reservoir for the plastic material used in the mold assembly;

a conduit in said mold assembly connecting said reservoir to said upper cavity and said lower cavity, so that plastic in said reservoir has a path of travel through said conduit and into both said upper and lower cavities;

first pressure means for forcing the plastic in said reservoir through said conduit and into said upper and lower cavities;

a bore hold formed in at least one of said upper and lower molds, said bore hole extending outwardly from the cavity associated with said at least one of said upper and lower molds;

an insert slideably mounted in said bore hole, said insert consisting of a body having the same cross-sectional shape as the cross-sectional shape of the bore hole and having an inner surface that matches the intended shape of the cavity associated with said at least one of said upper and lower molds, and said insert being adapted for reciprocating movement along a main axis of said bore hole, so that the position of the insert in the bore hole defines the thickness of the plastic forced into the mold assembly by said first pressure means; and second pressure means operating on said insert for pushing the insert inwardly in said bore hole, thereby forcing excess plastic in said upper and lower cavities to flow through said conduit back into said reservoir, so that the thickness of the plastic forced into the mold assembly by said first pressure means can be reduced to a predetermined final thickness desired for the package of the integrated circuit lead frame;

wherein said upper mold and said lower mold are each integral mold members.

9. The apparatus of claim 8 wherein said first pressure means for forcing the plastic in said reservoir through said conduit and into said upper and lower cavities consists of a plunger.

10. The apparatus of claim 8, wherein said bore hole and said insert slideably mounted therein are cylindrical in shape.

11. The apparatus of claim 8, wherein said second pressure means applied to said insert for forcing excess plastic in said upper and lower cavities to flow through said conduit and into said reservoir consists of a plunger.

12. The apparatus of claim 10, wherein said second pressure means applied to said insert for forcing excess plastic in said upper and lower cavities to flow through said conduit and into said reservoir consists of a plunger.

13. The apparatus of claim 8, wherein the predetermined final thickness of the package of the integrated circuit lead frame, as defined by said bore hole and insert, is between 0.8 and 1.4 millimeters.

14. The apparatus of claim 12, wherein the predetermined final thickness of the package of the integrated circuit lead frame, as defined by said bore hole and insert, is between 0.8 and 1.4 millimeters.

* * * * *